(12) United States Patent
Finamore et al.

(10) Patent No.: US 7,633,698 B2
(45) Date of Patent: Dec. 15, 2009

(54) CONTROLLING A WRITE INHIBIT THRESHOLD BASED ON VIBRATION

(75) Inventors: David Finamore, Louisville, CO (US); Farhad Navid, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 240 days.

(21) Appl. No.: 11/712,624

(22) Filed: Mar. 1, 2007

(65) Prior Publication Data

US 2007/0242386 A1 Oct. 18, 2007

Related U.S. Application Data

(60) Provisional application No. 60/744,868, filed on Apr. 14, 2006.

(51) Int. Cl.
G11B 19/04 (2006.01)
(52) U.S. Cl. .................................................. 360/60
(58) Field of Classification Search ................. None
See application file for complete search history.

(56) References Cited

U.S. PATENT DOCUMENTS

| | | | |
|---|---|---|---|
| 5,426,545 A | 6/1995 | Sidman et al. | |
| 6,178,058 B1 | 1/2001 | Pan et al. | |
| 6,429,990 B2 | 8/2002 | Serrano et al. | |
| 6,538,839 B1 | 3/2003 | Ryan | |
| 6,567,233 B1 | 5/2003 | Chew et al. | |
| 6,633,454 B1 | 10/2003 | Martin et al. | |
| 6,754,021 B2 * | 6/2004 | Kisaka et al. | 360/60 |
| 6,882,489 B1 * | 4/2005 | Brunnett et al. | 360/60 |
| 6,914,743 B1 | 7/2005 | Narayana et al. | |
| 7,002,766 B2 * | 2/2006 | Kisaka et al. | 360/60 |
| 7,027,255 B2 | 4/2006 | Schmidt | |
| 7,130,142 B2 * | 10/2006 | Hara | 360/60 |
| 7,154,690 B1 * | 12/2006 | Brunnett et al. | 360/60 |
| 7,253,982 B1 * | 8/2007 | Brunnett et al. | 360/60 |
| 7,321,477 B2 * | 1/2008 | Suzuki et al. | 360/60 |
| 7,333,282 B2 * | 2/2008 | Iseri et al. | 360/60 |
| 7,400,467 B1 * | 7/2008 | Calihan et al. | 360/77.02 |
| 7,408,732 B2 * | 8/2008 | Kisaka et al. | 360/60 |
| 7,545,593 B1 * | 6/2009 | Sun et al. | 360/60 |
| 2005/0152057 A1 * | 7/2005 | Schmidt | 360/60 |
| 2005/0152058 A1 * | 7/2005 | Schmidt | 360/60 |
| 2006/0215307 A1 * | 9/2006 | Yoshida et al. | 360/75 |
| 2007/0153412 A1 * | 7/2007 | Takeda et al. | 360/60 |

* cited by examiner

*Primary Examiner*—Hoa T Nguyen
*Assistant Examiner*—James L Habermehl
(74) *Attorney, Agent, or Firm*—Westman, Champlin & Kelly, P.A.

(57) ABSTRACT

A disk drive can include a data storage disk, a head, an acceleration sensor, and a controller. The head is configured to write data on the disk. The acceleration sensor generates an acceleration signal that is indicative of acceleration of the disk drive. The controller determines when the disk drive is being subjected to a vibration condition determination. The controller can inhibit writing of data through the head onto the disk based on comparison of the acceleration signal to the threshold value.

10 Claims, 4 Drawing Sheets

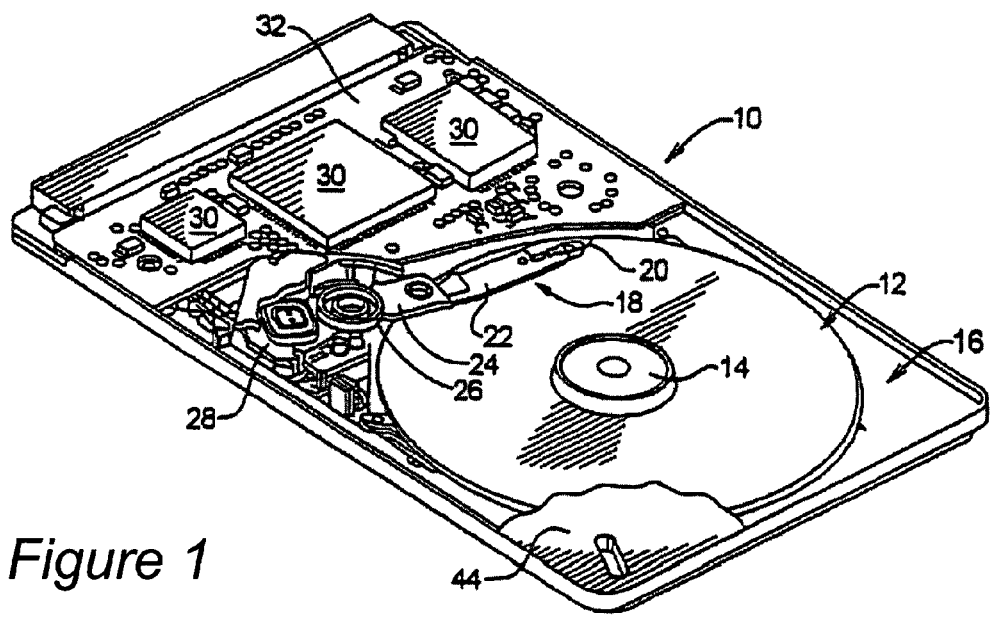
Figure 1
Figure 2
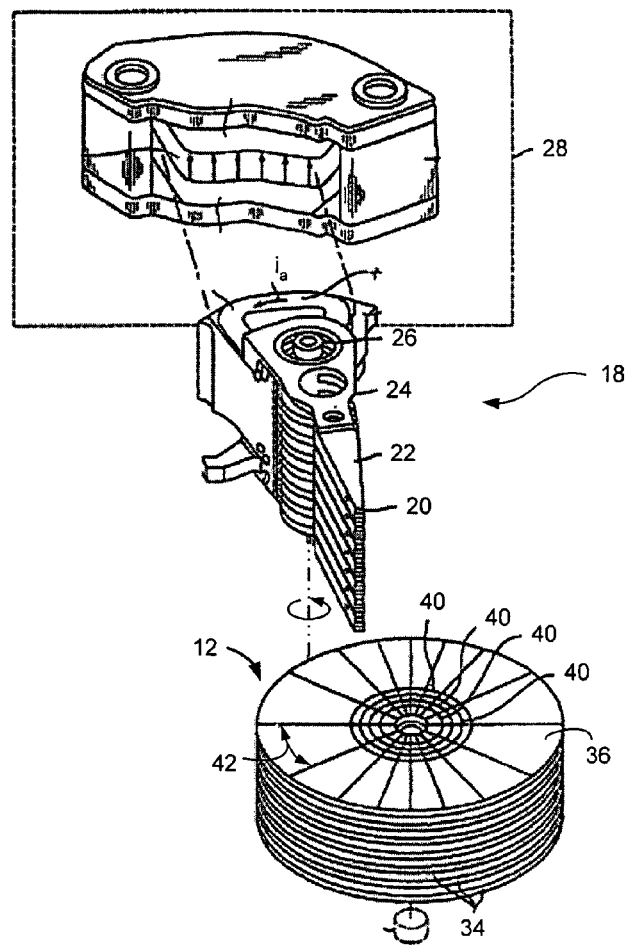

ized to cover all modifications, equivalents, and alternatives falling within the spirit and scope of the invention as defined by the claims. Like numbers refer to like elements throughout the description of the figures.

CONTROLLING A WRITE INHIBIT THRESHOLD BASED ON VIBRATION

RELATED APPLICATION

This application claims the benefit of and priority to U.S. Provisional Patent Application Ser. No. 60/744,868, filed Apr. 14, 2006, the disclosure of which is hereby incorporated herein by reference as if set forth in its entirety.

FIELD OF THE INVENTION

The present invention generally relates to digital data storage devices and, more particularly, to a disk drive that selectively inhibits writing of data to tracks on a disk in the disk drive, and related methods.

BACKGROUND

Disk drives are digital data storage devices that can enable users of computer systems to store and retrieve large amounts of data in a fast and efficient manner. A typical disk drive includes a plurality of magnetic recording disks that are mounted to a rotatable hub of a spindle motor and rotated at a high speed. An array of read/write heads is disposed adjacent surfaces of the disks to transfer data between the disks and a host computer. The heads can be radially positioned over the disks by a rotary actuator and a closed loop servo system, and can fly proximate the surfaces of the disks upon air bearings.

A plurality of nominally concentric tracks can be defined on each disk surface. A preamp and driver circuit generates write currents that are used by the head to selectively magnetize the tracks during a data write operation and amplifies read signals detected by the head from the selective magnetization of the tracks during a data read operation. A read/write channel and interface circuit are connected to the preamp and driver circuit to transfer the data between the disks and the host computer.

The servo system can operate in two primary modes: seeking and track following. During a seek, a selected head is moved from an initial track to a destination track on the corresponding disk surface. Thereafter, the servo system enters the track following mode wherein the head is maintained over the center of the destination track until another seek is performed.

Read and write operations may be performed during track following mode. In order to reduce the occurrence of off-track writes (i.e. writing while the head is located more than a threshold distance from the center of the desired track), the servo system tracks the position of the head by means of a position error signal that is fed back to the servo system. The servo system moves the head in response to the position error signal in an attempt to minimize the position error signal.

In addition to responding to signals from the servo system, the position of the head is affected by operational shock and/or vibration of the disk drive. For example, vibration and/or shock may be transmitted to the disk drive through the frame or housing in which it is mounted. In particular, operational shock may result in large position errors over short periods of time. If the position error signal exceeds a fixed threshold level, data writing may be inhibited until the position error signal is reduced below the threshold level and/or a predetermined number of disk rotations has occurred. Some disk drives include a shock sensor that outputs a shock signal which indicates the occurrence and magnitude of a shock that the disk drive is experiencing. Although inhibiting writes based on a position error threshold and shock signal threshold is implemented in some disk drives, off-track writes may occur at an unacceptable rate if the threshold values are too high. In contrast, if the threshold values are too low, the data throughput of the disk drive may be significantly impaired.

SUMMARY

In some embodiments of the present invention, a circuit includes a controller that determines when a disk drive is being subjected to a vibration condition and varies a write inhibit threshold for the disk drive in response to the vibration condition determination.

In some further embodiments, the controller lowers the write inhibit threshold when the disk drive is not being subjected to a vibration condition, and raises the write inhibit threshold when the disk drive is being subjected to a vibration condition. By lowering the write inhibit threshold in the absence of a vibration condition, the controller may be able to detect and inhibit writing in response a lower level shock condition that may otherwise not be detected if the write inhibit threshold were maintained at a higher level.

Some other embodiments of the present invention are directed to related methods of controlling writing in a disk drive in response to a controllable write inhibit threshold.

DESCRIPTION OF THE DRAWINGS

The accompanying drawings, which are included to provide a further understanding of the invention and are incorporated in and constitute a part of this application, illustrate certain embodiment(s) of the invention. In the drawings:

FIG. 1 is a block diagram of a disk drive with electronic circuits that are configured to control a write inhibit threshold based on vibration in accordance with some embodiments of the present invention.

FIG. 2 is a block diagram of an exemplary head disk assembly of the disk drive.

DETAILED DESCRIPTION OF EMBODIMENTS OF THE INVENTION

Figure 3:
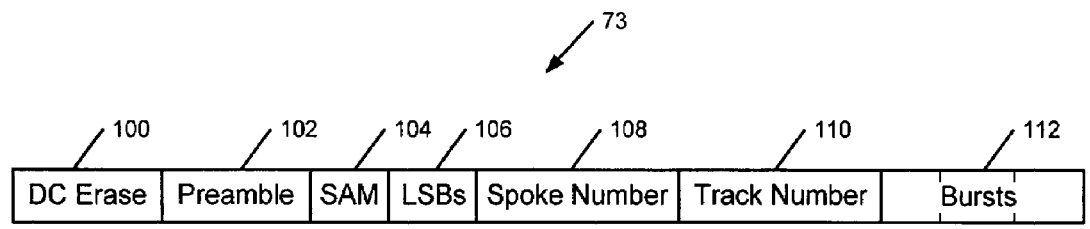
FIG. 3 is a block diagram of servo information fields in a servo spoke.

The present invention now will be described more fully hereinafter with reference to the accompanying drawings, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items. It will be understood that, although the terms first, second, etc. may be used herein to describe various steps, elements and/or regions, these steps, elements and/or regions should not be limited by these terms. These terms are only used to distinguish one step/element/region from another step/element/region. Thus, a first step/element/region discussed below could be termed a second step/element/region without departing from the teachings of the present invention.

The present invention may be embodied in hardware (analog and/or discrete) and/or in software (including firmware, resident software, micro-code, etc.). Consequently, as used herein, the term "signal" may take the form of a continuous waveform and/or discrete value(s), such as digital value(s) in a memory or register.

The present invention is described below with reference to block diagrams of disk drives and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows. Like numbers refer to like elements throughout the description of the figures.

A simplified diagrammatic representation of a disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

The actuator arm assembly 18 includes a head 20 (or transducer) mounted to a flexure arm 22 which is attached to an actuator arm 24 that can rotate about a pivot bearing assembly 26. The head 20 may, for example, include a magnetoresistive (MR) element and/or a thin film inductive (TFI) element. The actuator arm assembly 18 also includes a motor 28, such as a voice coil motor (VCM), which radially moves the head 20 across the disk stack 12. The spindle motor 14 and actuator arm assembly 18 are coupled to a controller, read/write channel circuits, and other associated electronic circuits 30 which are configured in accordance with at least one embodiment of the present invention, and which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 14.

The actuator arm assembly 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 across their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks and sectors on the disks 34. Data is stored on the disks 34 within a number of concentric tracks 40 (or cylinders). Each track 40 is divided into a plurality of radially extending sectors 42. Each sector is further divided into a plurality of data sectors defined between adjacent servo spokes. The servo spokes are used to, among other things, accurately position the head 20 so that data can be properly written onto and read from a selected track. The data sectors are where non-servo related data (i.e., host device data) is stored and retrieved.

FIG. 3 illustrates exemplary servo information 73 that may be stored in at least some of the servo spokes within the radial sectors 42. The servo information 73 can include a DC erase field 100, a preamble field 102, a servo address mark (SAM) field 104, a track number field indicated by its least significant bits (LSBs) 106, a spoke number field 108, an entire track number field 110 which may be recorded in at least one of the servo spokes, and a servo burst field 112 of circumferentially staggered radially offset servo bursts (e.g., A, B, C, D servo bursts).

Figure 4:
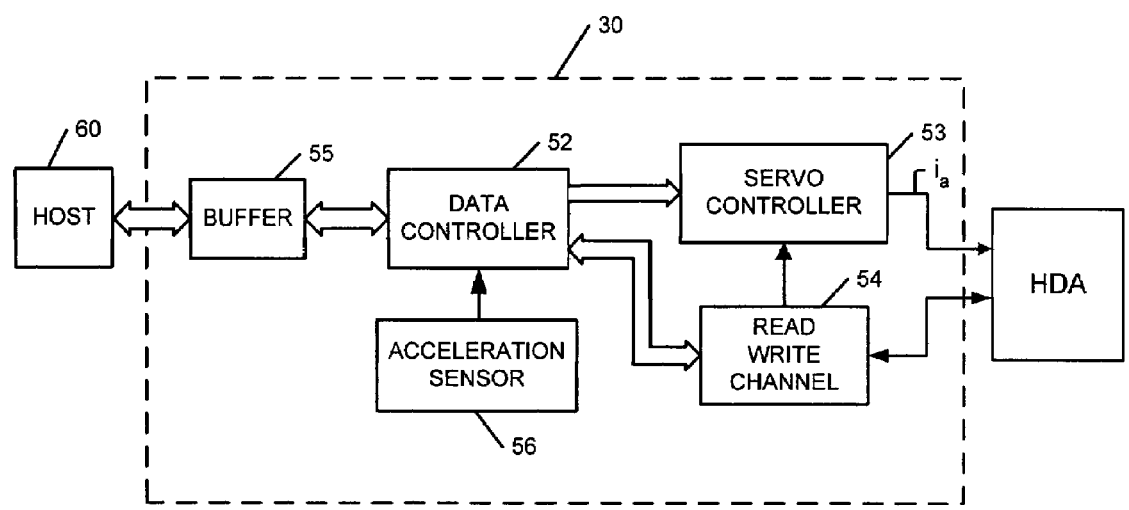
FIG. 4 is a block diagram of a portion of the controller of the disk drive shown in FIG. 1 and associated methods, which are configured in accordance with some embodiments of the present invention.

FIG. 4 is a block diagram of a portion of the controller 30 of the disk drive 10 shown in FIG. 1 that is communicatively connected to a host device 60 and configured to operate in accordance with some embodiments, and associated methods thereof. The controller 30 can include a data controller 52, a servo controller 53, a read write channel 54, a buffer 55, and an acceleration sensor 56. Although the controllers 52 and 53, the buffer 55, the read write channel 54, and the acceleration sensor 56 have been shown as separate blocks for purposes of illustration and discussion, it is to be understood that their functionality described herein may be integrated within a common integrated circuit package or distributed among more than one integrated circuit package. The head disk assembly (HDA) 56 can include a plurality of the disks 34, a plurality of the heads 20 mounted to the actuator arm assembly 18 and positioned adjacent to different data storage surfaces of the disks 34, the VCM 28, and the spindle motor 14.

Write commands and associated data from the host device 60 are buffered in the buffer 55. The data controller 52 is configured to carry out buffered write commands by formatting the associated data into blocks with the appropriate header information, and transferring the formatted data from the buffer 55, via the read/write channel 54, to data sectors along one or more tracks on the disk 34 identified by the associated write command.

The read write channel 54 can operate in a conventional manner to convert data between the digital form used by the data controller 52 and the analog form conducted through the heads 20 in the HDA 56. The read write channel 54 provides servo positional information read from the HDA 56, such as from the exemplary servo information 73 of FIG. 3, to the servo controller 53. The servo positional information can be used to detect the location of the heads 20 in relation to target data sectors on the disks 34. The servo controller 53 can use target data sectors from the data controller 52 and the servo positional information to seek the heads 20 to an addressed track and data sector on the disk 34, and to attempt to maintain the heads 20 aligned with the track while data is written/read on one or more identified data sectors.

As explained above, when the disk drive 10 is subjected to shock and/or vibration, the heads 20 may be forced off-track. In particular, operational shock may result in large position errors over short periods of time. To avoid writing on an incorrect track(s) while the heads 20 are being forced off-track (e.g., to avoid loss of data and/or adjacent track erasure), the data controller 52 is configured to inhibit writing while the disk drive 10 is being subjected to a sizable shock condition and/or vibration condition.

The data controller 52 determines when to inhibit writing based on an acceleration signal generated by the acceleration sensor 56. The acceleration sensor 56 is configured to generate an acceleration signal that is indicative of acceleration of the disk drive 10. The acceleration sensor 56 may include, for example, one or more accelerometers, piezoelectric devices, and/or other devices.

In some embodiments, the data controller 52 determines when the disk drive is being subjected to a vibration condition and/or a shock condition based on the acceleration signal from the acceleration sensor 56. The data controller 52 inhibits writing of data through the head 20 onto the disk 34 based on comparison of the acceleration signal to a threshold value. For example, the data controller 52 can inhibit writing of data when a magnitude of the acceleration signal exceeds the threshold value. The data controller 52 also varies the threshold value based on the determination of whether the disk drive 10 is being subjected to the vibration condition. The data controller 52 may enable resumption of writing of data when the magnitude of the acceleration signal falls below the threshold value, after expiration of a defined write inhibit time (e.g., after the head 20 reads a defined number of servo spokes), and/or when the head 20 has returned to its nominal position over the track.

The data controller 52 can lower the threshold value when the disk drive 10 is not being subjected to a vibration condition, and can raise the threshold value when the disk drive 10 is being subjected to a vibration condition. By lowering the threshold value in the absence of a vibration condition, the data controller 52 may be able to detect and react to a lower level shock condition that may otherwise not be detected if the threshold value were maintained at a higher level. Because lower level shock conditions may therefore be detected, the data controller 52 may be able to inhibit writing during such lower level shock conditions and may, therefore, avoid erroneous off-track writing and loss of data and/or allowing other erroneous operation of the disk drive 10. By raising the threshold value during the occurrence of a vibration condition, the data controller 52 may avoid detecting and reacting to too many shock/vibration conditions, which may otherwise unnecessarily reduce the data input/output throughput of the disk drive 10.

The data controller 52 can also be configured to distinguish between occurrence of a vibration condition and occurrence of a shock condition, and can respond differently to those two different types of conditions. Because a shock condition typically lasts for a much briefer time than a vibration condition, the data controller 52 may enable resumption of the writing of data through the heads 20 more quickly following occurrence of a shock condition following occurrence of a vibration condition. Accordingly, the disk drive 10 may resume normal operation more quickly following a properly identified shock condition, rather than waiting a longer delay time that may be defined based on an expected longer lasting vibration condition.

The data controller 52 may distinguish between occurrence of a vibration condition and occurrence of a shock condition based on characteristics of the acceleration signal and/or based on characteristics of position error signals generated by the heads 20 reading servo information from the disks 34.

In some embodiments, the data controller 52 may determine that a vibration condition is occurring when a magnitude of the acceleration signal exceeds the threshold value for at least a threshold length of time, and may determine that a shock condition is occurring when the magnitude of the acceleration signal exceeds the threshold value for less than the threshold length of time, because shock conditions typically have a shorter duration than vibration conditions.

The data controller 52 may alternatively or additionally determine that a shock condition is occurring when the magnitude of the acceleration signal exceeds a shock threshold value that is greater than the threshold value, and may otherwise determine that a vibration condition is occurring (without a shock condition) when the magnitude of the acceleration signal exceeds the threshold value but is less than the shock threshold value.

The data controller 52 may alternatively or additionally determine that a shock condition is occurring when a position error signal, which is generated by a selected head 20 reading servo information from an associated disk 34, exceeds a threshold position error signal while the magnitude of the acceleration signal exceeds the threshold value, and may similarly determined that a vibration condition (without a shock condition) is occurring when the position error signal is less than the threshold position error signal.

By distinguishing between occurrence of a vibration condition from occurrence of a shock condition, the data controller 52 may raise the threshold value in response to determining that a vibration condition is occurring while a shock condition is not occurring, and may leave the threshold value unchanged when both a vibration condition and a shock condition are simultaneously occurring. The data controller 52 may raise the threshold value during a vibration condition because of an ability of the disk drive 10 to compensate for vibration, and may maintain the threshold value as-is during a shock condition because of a substantially reduced ability of the disk drive 10 compensate for shock.

While the data controller 52 is inhibiting writing of data because of a vibration condition, in the absence of a shock condition, the threshold value may become sufficiently increased so that the acceleration signal no longer exceeds the threshold value, which can result in the data controller 52 enabling resumption of writing of data.

The data controller 52 may measure statistical characteristics of the acceleration signal, such as an average background level (e.g., mean magnitude), frequency content, number/rate of peaks values, and/or statistical deviation, and may define or otherwise vary the threshold value based on the measured characteristics. Because the servo controller 53 may compensate for vibration in some frequency bands better than others, the data controller 52 may define and/or adjust the threshold value based on the measured frequency content of the acceleration signal so as to respond to higher versus lower amounts of frequency content in certain bands. Thus, for example, the threshold value may be initially defined based on measured statistical characteristics of the acceleration signal. The threshold value may be increased while a vibration condition is occurring and a shock condition is not occurring, and may be decreased while neither a vibration condition nor a shock condition are occurring. Accordingly, the threshold value can be dynamically tuned so that the data controller 52 may identify and respond to lower-level shocks. The data controller 52 may additionally or alternatively define or otherwise vary the threshold value based on how often writing of data is inhibited responsive to the comparison of the acceleration signal to the threshold value. Thus, for example, the threshold value may be defined or varied to avoid an excessive number of inhibited writes during a defined period of time.

Figure 5:
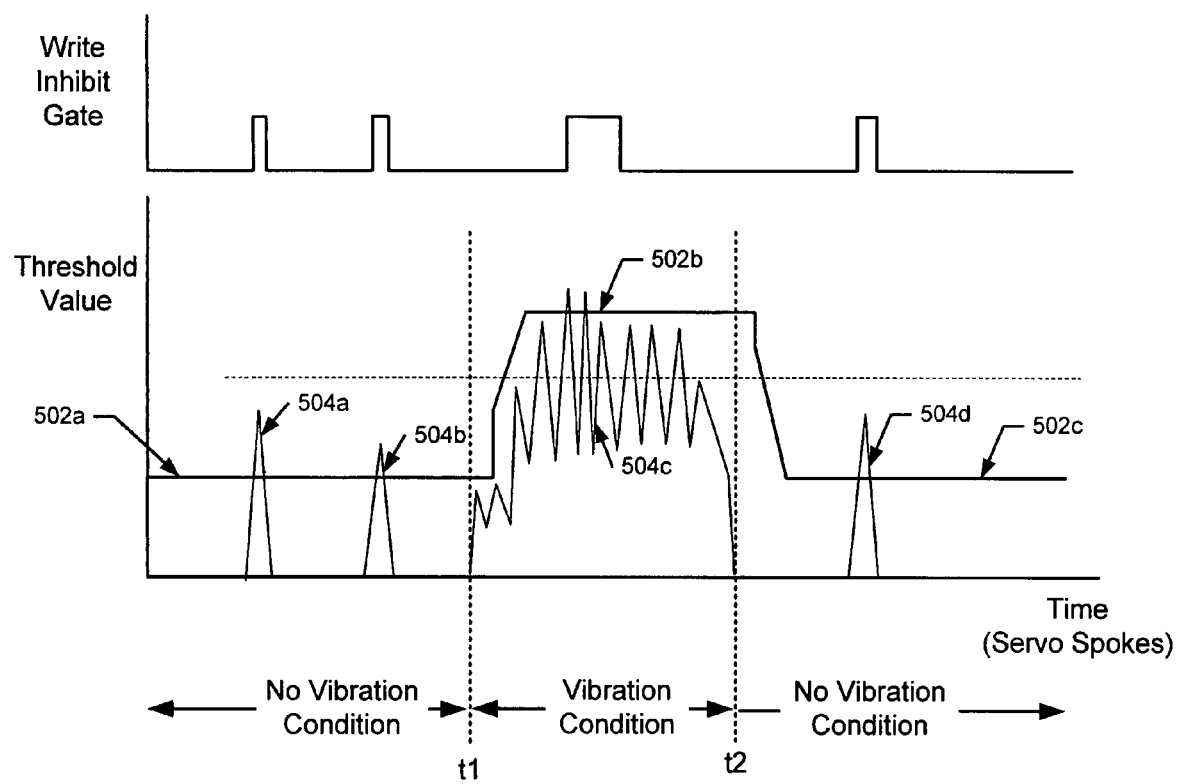
FIG. 5 is a graph showing variation of write inhibit threshold values in response to vibration and no-vibration conditions and associated detection of shock conditions in accordance with some embodiments of the present invention.
Figure 6:
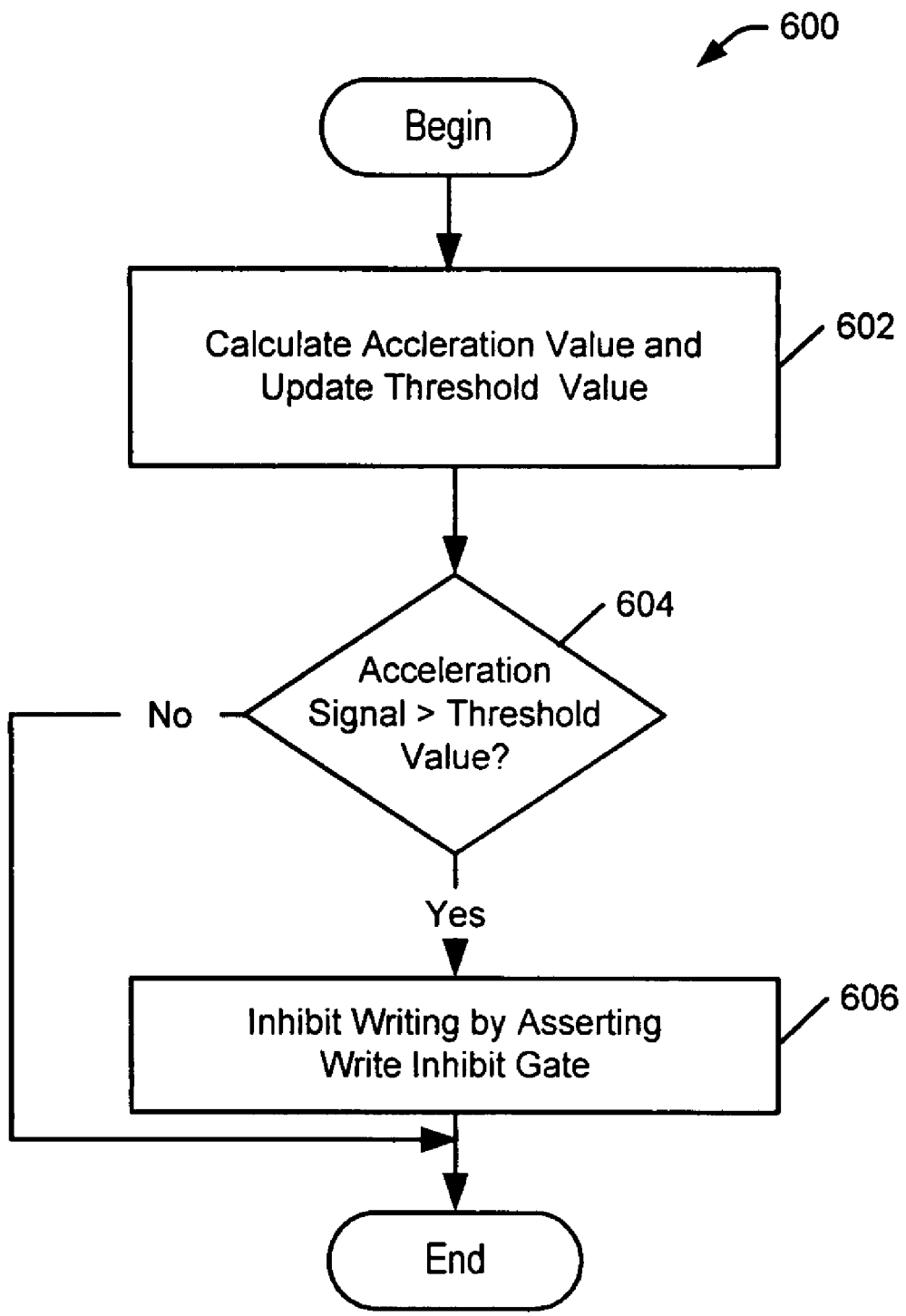
FIG. 6 is a flowchart illustrating operations of a controller configured according to some embodiments of the present invention.

FIG. 5 is an exemplary graph that shows variation of write inhibit threshold values in response to vibration and no-vibration conditions and associated detection of shock conditions in accordance with some embodiments of the present invention. Referring to FIG. 5, the write inhibit threshold value may be initially set to level 502a which can be determined during drive design and/or during verification test of the disk drive 10, and may be refined during operation, such as based on measured statistical characteristics of the acceleration signal.

The write inhibit threshold value may be regulated (updated) once per calculation period, which may be, for example, once per disk revolution or once per sector 42. For example, the write inhibit threshold value may be regulated so as to track variation in samples of the acceleration signal, or the variation in the sampled acceleration signal may be time filter (e.g., averaged) over a time period that may correspond to a sector 42 and used to regulate the write inhibit threshold value. Accordingly, the write inhibit threshold value may be incrementally varied once per acceleration signal sample, once per defined number of acceleration signal samples, once per sector 42, once per disk revolution, and/or at another defined rate which may vary over time.

Before time t1, the disk drive 10 is not being subjected to a vibration condition and, responsive thereto, the threshold value is maintained at level 502a. The level 502a is defined to be sufficiently low to enable the data controller 52 to detect two low-level shock conditions, and, responsive thereto, to assert a write inhibit gate to inhibit writing when the respective acceleration signals 504a and 504b exceed the threshold value level 502a.

At about time t1, the disk drive 10 is subjected to a vibration condition as indicated by the acceleration signal 504c. The data controller 52 responds to the vibration condition by raising the threshold value to a higher level 502c. During the time period t1 to t2, the acceleration signal 504c briefly exceeds the threshold value which causes the write inhibit gate to be asserted for a defined time, after which write operations are not inhibited while the acceleration signal 504c is less than the increased threshold 502c. At time t2, disk drive 10 is no longer subjected to the vibration condition and the data controller 52 responds thereto by lowering the threshold value to a lower level 502d. Subsequently, the disk drive 10 is subjected to a shock condition as indicated by the acceleration signal 504d, which the data controller 52 can detect and respond to (e.g., by asserting the write inhibit gate to inhibit writing) because the acceleration signal 504d exceeds the threshold value 502d.

As illustrated, the duration of assertion of the write inhibit gate while the disk drive 10 is not subjected to a vibration condition (i.e., before time t1 and after time t2) can be substantially less than the duration of the write inhibit gate during the vibration condition (i.e., between times t1 and t2). The duration of assertion of the write inhibit gate may be defined so that the data controller 52 may resume writing data more quickly following occurrence of a shock condition than following occurrence of a vibration condition, because a shock condition typically lasts for a much briefer time than a vibration condition. The length of assertion of write inhibit gate may be determined during drive design, and/or during verification test of the disk drive 10, and may be refined during operation.

Although some embodiments of the invention have been described with reference to a disk drive including a dual-stage actuator configuration, the disk drive may in some embodiments include a single actuator.

The foregoing discussion of the invention has been presented for purposes of illustration and description. Further, the description is not intended to limit the invention to the form disclosed herein. Consequently, variations and modifications commensurate with the above teachings are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments.

What is claimed is:

1. A circuit comprising:
   a controller that determines when a disk drive is being subjected to a vibration condition and varies a write inhibit threshold for the disk drive in response to the vibration condition determination, determines that the disk drive is subjected to the vibration condition when a magnitude of an acceleration signal exceeds the write inhibit threshold for at least a threshold length of time, determines that the disk drive is subjected to a shock condition when the magnitude of the acceleration signal exceeds the write inhibit threshold for less than the threshold length of time, inhibits writing of data though a head onto a data storage disk in response to determining that the disk drive is being subjected to the vibration condition or to the shock condition, and enables resumption of writing of data through the head onto the disk more quickly following a determined occurrence of the shock condition than following a determined occurrence of the vibration condition.

2. The circuit of claim 1, wherein the controller is further configured to raise the write inhibit threshold in response to determining onset of the vibration condition and determining absence of onset of the shock condition, and to enable resumption of writing of data through the head onto the disk in response to the magnitude of the acceleration signal becoming below the write inhibit threshold.

3. A circuit comprising:
   a controller that determines when a disk drive is being subjected to a vibration condition, determines that the disk drive is being subjected to a shock condition when the magnitude of an acceleration signal exceeds a shock threshold value that is greater than the write inhibit threshold, inhibits writing of data in response to determining that the disk drive is being subjected to the vibration condition or the shock condition, and enables resumption of writing of data more quickly following a determined occurrence of the shock condition than following a determined occurrence of the vibration condition.

4. A circuit comprising:
a controller that determines when a disk drive is being subjected to a vibration condition, determines that the disk drive is being subjected to a shock condition when a position error signal, which is generated by a head reading servo information from a data storage disk, exceeds a threshold position error signal and the magnitude of the acceleration signal exceeds the write inhibit threshold, inhibits writing of data in response to determining that the disk drive is being subjected to the vibration condition or the shock condition, and enables resumption of writing of data more quickly following a determined occurrence of the shock condition than following a determined occurrence of the vibration condition.

5. The circuit of claim 4, wherein the controller is further configured to determine that the disk drive is being subjected to the vibration condition when the position error signal does not exceed the threshold position error signal and the magnitude of the acceleration signal exceeds the write inhibit threshold.

6. The circuit of claim 4, wherein the controller is further configured to raise the write inhibit threshold in response to determining onset of the vibration condition and determining absence of onset of the shock condition, and to enable resumption of writing of data in response to the magnitude of the acceleration signal becoming below the write inhibit threshold.

7. A circuit comprising:
a controller that determines when a disk drive is being subjected to a vibration condition, measures frequency content of an acceleration signal, and varies a write inhibit threshold for the disk drive based on the measured frequency content of the acceleration signal.

8. A method of controlling writing in a disk drive, the method comprising:
determining when the disk drive is being subjected to a vibration condition by determining that the disk drive is being subjected to the vibration condition when an acceleration signal exceeds the write inhibit threshold for at least a threshold length of time, and determining that the disk drive is being subjected to a shock condition when the acceleration signal exceeds the write inhibit threshold for less than the threshold length of time;
varying a write inhibit threshold in response to the vibration condition determination
inhibiting writing of data onto a data storage disk in response to determining that the disk drive is being subjected to the vibration condition or the shock condition; and
enabling resumption of writing data more quickly following a determined occurrence of the shock condition than following a determined occurrence of the vibration condition.

9. The method of claim 8, further comprising:
raising the write inhibit threshold in response to determining onset of the vibration condition and determining absence of onset of the shock condition; and
enabling resumption of writing of data onto a data storage disk in response to the magnitude of the acceleration signal becoming below the write inhibit threshold.

10. The method of claim 8, further comprising determining that the disk drive is being subjected to the vibration condition when a position error signal, which is generated by a head reading servo information from a data storage disk, does not exceed a threshold position error signal and the acceleration signal exceeds a write inhibit threshold.

* * * * *

UNITED STATES PATENT AND TRADEMARK OFFICE
CERTIFICATE OF CORRECTION

PATENT NO.            : 7,633,698 B2                                            Page 1 of 1
APPLICATION NO.  : 11/712624
DATED                    : December 15, 2009
INVENTOR(S)          : Finamore et al.

It is certified that error appears in the above-identified patent and that said Letters Patent is hereby corrected as shown below:

Column 8
Line 44, after data replace "though" with --through--.

Signed and Sealed this

First Day of June, 2010

David J. Kappos
*Director of the United States Patent and Trademark Office*